US012783811B2

(12) United States Patent
Deng et al.

(10) Patent No.: US 12,783,811 B2
(45) Date of Patent: Nov. 3, 2026

(54) LARGE-SCALE TEXT CLUSTER METHODS AND APPARATUSES

(71) Applicant: Alipay (Hangzhou) Information Technology Co., Ltd., Hangzhou (CN)

(72) Inventors: Junhao Deng, Hangzhou (CN); Kezun Zhang, Hangzhou (CN); Taifeng Wang, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 390 days.

(21) Appl. No.: 18/525,447

(22) Filed: Nov. 30, 2023

(65) Prior Publication Data

US 2024/0184990 A1 Jun. 6, 2024

(30) Foreign Application Priority Data

Dec. 2, 2022 (CN) ........................ 202211538156.6

(51) Int. Cl.
*G06F 40/30* (2020.01)

(52) U.S. Cl.
CPC .................................... *G06F 40/30* (2020.01)

(58) Field of Classification Search
CPC ....................................................... G06F 40/30
See application file for complete search history.

(56) References Cited

U.S. PATENT DOCUMENTS

2017/0220545 A1* 8/2017 Gururajan ............. G06F 40/106
2019/0197129 A1* 6/2019 Yong ..................... G06F 40/247

FOREIGN PATENT DOCUMENTS

CN 107943982 B * 8/2020 ....... G06F 18/23213
CN 112182206 A * 1/2021 ............. G06F 18/24
CN 114547311 A * 5/2022 ............. G06F 18/22
CN 114741517 A * 7/2022 ......... G06F 18/2155

(Continued)

OTHER PUBLICATIONS

L. Wang and Y. Yu, "Study of Text Clustering in Semantic Web", 2019, 2019 IEEE 14th International Conference on Intelligent Systems and Knowledge Engineering (ISKE), Dalian, China, 2019, pp. 1287-1293 (Year: 2019).*

(Continued)

*Primary Examiner* — Eric Yen

(57) ABSTRACT

A method includes coarse clustering and secondary fine clustering. First, semantic vectors respectively corresponding to a plurality of texts are determined by using a semantic representation model, and a similarity matrix between the plurality of texts is determined based on the semantic vectors of the plurality of texts. Next, in a coarse clustering phase, M similar texts with maximum similarities respectively corresponding to the plurality of texts are determined from the similarity matrix, and the corresponding texts are used as selected central texts when the similarities corresponding to the M similar texts are greater than a threshold, to quickly remove a large amount of isolated noise. Then, candidate class clusters are obtained based on data corresponding to the central texts in the similarity matrix, candidate class clusters with a cross-text are combined, and then secondary fine clustering is performed on a combined class cluster.

13 Claims, 2 Drawing Sheets

(56) References Cited

FOREIGN PATENT DOCUMENTS

| | | | |
|---|---|---|---|
| CN | 109783816 B | * | 4/2023 |

OTHER PUBLICATIONS

Google Translation of CN112182206A, 2020, https://patents.google.com/patent/CN112182206A/en?oq=CN112182206A (Year: 2020).*
Google Translation of CN109783816B, 2019, https://patents.google.com/patent/CN109783816B/en?oq=CN109783816B (Year: 2019).*
Google Translation of CN107943982B, 2017, https://patents.google.com/patent/CN107943982B/en?oq=CN107943982B (Year: 2017).*
Google Translation of CN114741517A, 2022, https://patents.google.com/patent/CN114741517A/en?oq=CN114741517A (Year: 2022).*
Google Translation of CN114547311A, https://patents.google.com/patent/CN114547311A/en?oq=CN114547311A (Year: 2022).*

* cited by examiner

LARGE-SCALE TEXT CLUSTER METHODS AND APPARATUSES

TECHNICAL FIELD

One or more embodiments of this specification relate to the field of data processing technologies, and in particular, to large-scale text clustering methods and apparatuses.

BACKGROUND

On the Internet platform, a large amount of text data is generated at every moment. Through text clustering, a computing device can cluster texts with the same semantic meaning in the text data, and then obtain hot information in the text data through statistical calculation. For example, in the news field, hot events in the society can be obtained in time by clustering news titles, which can be used in scenarios such as subsequent user push. In the customer service platform field, cluster analysis can be performed on problems that users query and feed back in a period of time to identify, in time, hot problems that the users feed back, to help a system perform problem warning. The text data usually also includes private data. When the text data is clustered, protection of the private data in the text data needs to be taken into consideration, to prevent the private data from being leaked. Text clustering can further be applied to more scenarios to provide more convenience. Currently, a long time is consumed when large-scale text data is clustered. Therefore, it is desirable to more quickly cluster texts in a large-scale scenario.

SUMMARY

One or more embodiments of this specification describe a large-scale text clustering method and apparatus, to more quickly cluster texts in a large-scale scenario. Specific technical solutions are as follows.

According to a first aspect, one or more embodiments provide a large-scale text clustering method, including following:

for to-be-clustered texts including a plurality of texts, semantic vectors respectively corresponding to the plurality of texts are determined by using a semantic representation model;

a similarity matrix between the plurality of texts is determined based on the semantic vectors of the plurality of texts;

M similar texts with maximum similarities respectively corresponding to the plurality of texts are determined from the similarity matrix; and the corresponding texts are used as selected central texts when the similarities corresponding to the M similar texts are greater than a first threshold; and the to-be-clustered texts are clustered based on data corresponding to the central texts in the similarity matrix.

In an implementation, the step of determining semantic vectors respectively corresponding to the plurality of texts includes following:

semantic vectors that are respectively corresponding to the plurality of texts and that include global semantic information of the texts are determined by using the semantic representation model.

In an implementation, the step of determining, from the similarity matrix, M similar texts with maximum similarities respectively corresponding to the plurality of texts includes following:

the M similar texts with the maximum similarities respectively corresponding to the plurality of texts are determined from the similarity matrix by using a parallel computing tool encapsulated by a deep learning framework, or by constructing an index by a vector retrieval engine.

In an implementation, the step of using the corresponding texts as selected central texts when the similarities corresponding to the M similar texts are greater than a first threshold includes following:

for any of the plurality of texts, a minimum similarity of the M similar texts corresponding to the text is compared with the first threshold, and the text is used as the selected central text when the minimum similarity is greater than the first threshold.

In an implementation, the step of clustering the to-be-clustered texts based on data corresponding to the central texts in the similarity matrix includes following:

similar texts of several central texts are separately determined from the similarity matrix, to obtain several first candidate class clusters;

first candidate class clusters with a cross-text are combined to obtain several second candidate class clusters; and secondary fine clustering is separately performed on the several second candidate class clusters based on texts respectively included in the second candidate class clusters, to obtain a class cluster for clustering the to-be-clustered texts.

In an implementation, the step of separately determining similar texts of several central texts from the similarity matrix includes:

for any first central text in the several central texts, C similar texts with maximum similarities corresponding to the first central text are determined from the similarity matrix, and a similar text with a similarity greater than a second threshold in the C similar texts and the first central text are used as a corresponding first candidate class cluster, to obtain several first candidate class clusters, where C is greater than M.

In an implementation, the step of combining first candidate class clusters with a cross-text includes following:

the several first candidate class clusters are sorted in descending order of quantities of included texts; and cross-text determining is sequentially performed on the sorted several first candidate class clusters, and class cluster combination is performed based on a determining result.

In an implementation, the step of sequentially performing cross-text determining on the sorted several first candidate class clusters includes following:

hash values of identifiers of the texts included in the several first candidate class clusters are determined; and cross-text determining is sequentially performed on the sorted several first candidate class clusters based on matching between the hash values.

In an implementation, after the performing class cluster combination based on a determining result, the method further includes following:

for any combined first candidate class cluster, if a quantity of texts included in the combined first candidate class cluster is greater than a predetermined quantity threshold, combination stops to continue to be performed on the combined first candidate class cluster.

In an implementation, the step of separately performing secondary fine clustering on the several second candidate class clusters includes following:

secondary fine clustering is separately performed on the several second candidate class clusters by using a hierarchical clustering algorithm based on texts respectively included in the second candidate class clusters.

In an implementation, M is a value in a predetermined range, or M is determined based on a total quantity of the plurality of texts.

According to a second aspect, one or more embodiments provide a large-scale text clustering apparatus, including:

a semantic module, configured to: for to-be-clustered texts including a plurality of texts, determine, by using a semantic representation model, semantic vectors respectively corresponding to the plurality of texts;

a similarity module, configured to determine a similarity matrix between the plurality of texts based on the semantic vectors of the plurality of texts;

a selection module, configured to determine, from the similarity matrix, M similar texts with maximum similarities respectively corresponding to the plurality of texts; and using the corresponding texts as selected central texts when the similarities corresponding to the M similar texts are greater than a first threshold; and a clustering module, configured to cluster the to-be-clustered texts based on data corresponding to the central texts in the similarity matrix.

In an implementation, the clustering module includes:

a determining submodule, configured to separately determine similar texts of several central texts from the similarity matrix, to obtain several first candidate class clusters;

a combination submodule, configured to combine first candidate class clusters with a cross-text to obtain several second candidate class clusters; and a clustering submodule, configured to separately perform secondary fine clustering on the several second candidate class clusters based on texts respectively included in the second candidate class clusters, to obtain a class cluster for clustering the to-be-clustered texts.

According to a third aspect, one or more embodiments provide a computer-readable storage medium. The computer-readable storage medium stores a computer program, and when the computer program is executed in a computer, the computer is enabled to perform the method in any implementation of the first aspect.

According to a fourth aspect, one or more embodiments provide a computing device, including a memory and a processor. The memory stores executable code, and when executing the executable code, the processor implements the method in any implementation of the first aspect.

According to the methods and the apparatuses provided in the embodiments of this specification, the M similar texts with the maximum similarities respectively corresponding to the plurality of texts are determined from the similarity matrix based on the similarity matrix between the plurality of texts, and a text whose similarity is greater than the first threshold is selected from the M similar texts, so that a small amount of isolated noise can be filtered out from the similar texts to select possible center texts for clustering. In a scenario with large-scale text data, in this method, there is no need to compare a large quantity of similarities, so that possible central texts for clustering can be quickly selected, thereby more quickly clustering large-scale texts.

BRIEF DESCRIPTION OF DRAWINGS

To describe the technical solutions in embodiments of this specification more clearly, the following briefly describes the accompanying drawings needed for describing the embodiments. Clearly, the accompanying drawings in the following descriptions show merely some embodiments of this specification, and a person of ordinary skill in the art can still derive other drawings from these accompanying drawings without creative efforts.

DESCRIPTION OF EMBODIMENTS

The solutions provided in this specification are described below with reference to the accompanying drawings.

Figure 1:
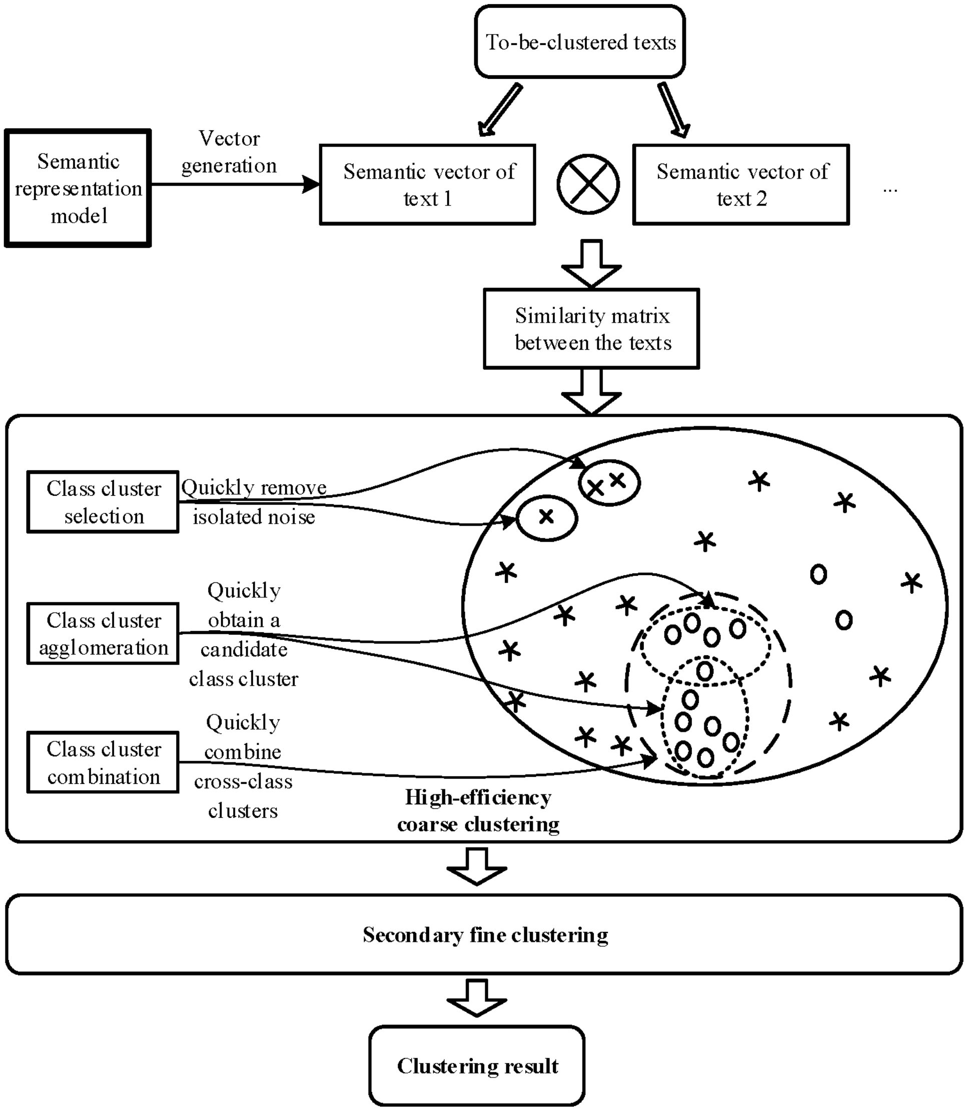
FIG. 1 is a schematic diagram illustrating an implementation scenario, according to one or more embodiments of this specification.

FIG. 1 is a schematic diagram illustrating an implementation scenario, according to one or more embodiments of this specification. To-be-clustered texts include a plurality of texts such as text 1 and text 2. Semantic vectors of the plurality of texts can be obtained through a process of generating vectors of the plurality of texts by a semantic representation model, so that a similarity matrix between the semantic vectors of the plurality of texts can be constructed. High-efficiency coarse clustering and secondary fine clustering can be performed on the plurality of texts by using the similarity matrix as basic data, to obtain a result of clustering the to-be-clustered texts. Facing large-scale to-be-clustered texts, it is expected that text clustering can be implemented more quickly and accurately. In a high-efficiency coarse clustering phase, class cluster selection is performed to quickly remove isolated noise, class cluster agglomeration is performed to quickly obtain a candidate class cluster, and class cluster combination is performed to quickly combine cross-class clusters. In this method, coarse clustering is quickly performed on large-scale texts, and a data amount of obtained coarse clustering results is greatly reduced. Next, secondary fine clustering is performed on the coarse clustering result, which can significantly improve accuracy of the clustering result, and does not take a long time.

A text can include one sentence, or can include a plurality of sentences. A text can include several sentences separated by punctuation. Text division can be distinguished based on an application scenario. For example, in the news field, a news title can be considered as a text, or a short news statement can be considered a text. In the customer service platform field, a message entered by a user can be considered as a text. In a physical sense, a text is a piece of text that includes complete semantic meanings. The to-be-clustered text usually does not have a class label.

Text clustering is a text processing method that aggregates texts having no class label but having the same semantic features. When the texts are clustered together, further application can be performed based on a quantity of texts clustered together and information extracted from the texts. Therefore, text clustering has a very important application value.

On the Internet platform, tens of thousands of texts or hundreds of thousands of texts may be generated in a period of time. To quickly cluster large-scale texts, one or more embodiments of this specification provide a large-scale text clustering method. The method includes the following steps: Step S210: For to-be-clustered texts including a plurality of texts, determine, by using a semantic representation model, semantic vectors respectively corresponding to the plurality of texts. Step S220: Determine a similarity matrix between the plurality of texts based on the semantic vectors of the plurality of texts. Step S230: Determine, from the similarity matrix, M similar texts with maximum similarities respectively corresponding to plurality of texts, and use the corresponding texts as selected central texts when the similarities corresponding to the M similar texts are greater than a first threshold, where M is less than a first value. Step S240: Cluster the to-be-clustered texts based on data corresponding to the central texts in the similarity matrix. In the one or more embodiments, a small amount of isolated noise can be quickly filtered out from the similar texts by using a simple operation step, thereby avoiding a time-consuming operation of comparing a large quantity of similarities. Therefore, a speed of text clustering can be improved, and consumed time can be shortened.

Figure 2:
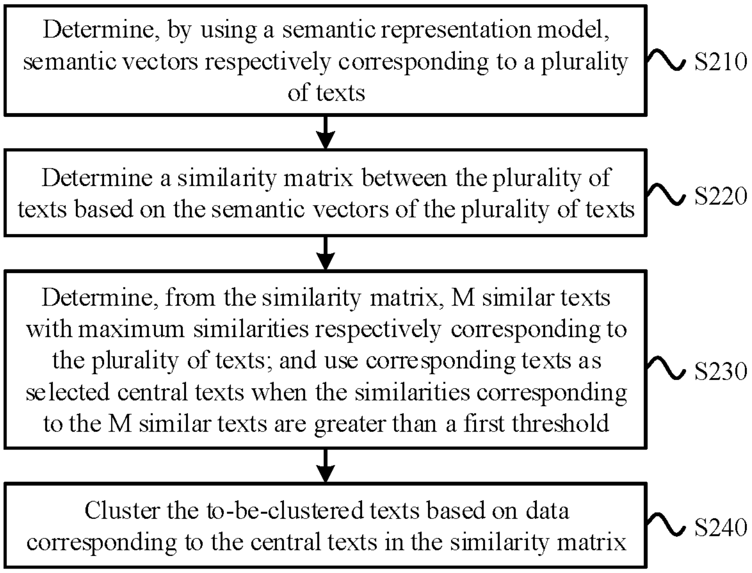
FIG. 2 is a schematic flowchart illustrating a large-scale text clustering method, according to one or more embodiments.

The following describes the one or more embodiments in detail by using a schematic flowchart shown in FIG. 2.

FIG. 2 is a schematic flowchart illustrating a large-scale text clustering method, according to one or more embodiments. The one or more embodiments can be performed by a computing device, and the computing device can be implemented by any apparatus, device, platform, device cluster, etc. that has a computing and processing capability. The method includes the following steps.

In step S210, for to-be-clustered texts including a plurality of texts, semantic vectors respectively corresponding to the plurality of texts are determined by using a semantic representation model. The semantic representation model is used to determine a semantic vector of a text. The semantic vector is a feature representation form of the text, and is a vector that includes semantic information of the text. Extracting the semantic vector of the text is implementing semantic representation of the text, thereby converting the text from words into a vector with the semantic information of the text. Specifically, the computing device can obtain to-be-clustered texts including N texts, for example, can obtain the to-be-clustered texts from another device, or can obtain the to-be-clustered texts from an Internet platform through searching. N is an integer greater than 0, and is usually a large value.

In the one or more embodiments, a plurality of initial texts can be first obtained, and the plurality of texts are preprocessed to obtain to-be-clustered texts. The preprocessing can include operations such as de-duplication and error correction. During de-duplication, an algorithm such as MinHash can be used. Therefore, the to-be-clustered texts can be preprocessed texts. Each text can have a corresponding identifier (ID), and the identifier is used to distinguish and mark different texts.

When the semantic vector of the text is determined, each text can be input to the semantic representation model, and the semantic representation model extracts the semantic vector of the text, to respectively obtain semantic vectors of the N texts. For example, the semantic vector of text 1, the semantic vector of text 2, the semantic vector of text 3, etc. are respectively determined. Dimensions of the semantic vectors of the texts can be the same predetermined value.

Accuracy of the semantic vector directly determines effect of text clustering. To improve accuracy of the semantic vector, a semantic representation model that can extract global semantic information of a text can be selected, and further, semantic vectors that respectively correspond to the plurality of texts and that include global semantic information of the texts can be determined by using the semantic representation model.

In an implementation, the semantic representation model can be implemented by a comparative representation model such as SimCSE. The model SimCSE performs pre-training by using a bidirectional encoder representation from transformers (BERT) algorithm, to learn rich semantic information.

In actual applications, for text data without a labeled class label, self-supervised learning can be performed by using a comparative representation model to obtain a semantic representation model. Comparative learning is a model learning method that does not rely on labeled data, and automatically constructs similar instances and unsimilar instances, so that the similar instances are close in projection space and the unsimilar instances are far away from each other in the projection space. Self-supervised learning is a model learning method based on large-scale unsupervised data, and constructs auxiliary tasks that do not rely on manual labeling to perform supervised network learning to finally learn a valuable representation. In the one or more embodiments, the following step 1 to step 4 can be specifically used to train the semantic representation model.

Step 1: Obtain a first sample text and a second sample text that have no labeled class label.

Step 2: Determine at least two sample semantic vectors of the first sample text and a sample semantic vector of the second sample text by using the semantic representation model. For example, the first sample text can be input to the semantic representation model twice to respectively obtain two semantic vectors. The two semantic vectors have the same semantic meaning but have different representation forms. The second sample text is input to the semantic representation model to obtain the corresponding sample semantic vector.

Step 3: Construct a positive sample pair based on the at least two sample semantic vectors of the first sample text, and construct a negative sample pair based on the sample semantic vector of the first sample text and the sample semantic vector of the second sample text. For example, sample semantic vector a and sample semantic vector b of sample 1 construct a positive sample pair, semantic vector a of sample 1 and a sample semantic vector of sample 2 construct a negative sample pair, and semantic vector b of sample 1 and a sample semantic vector of sample 3 construct a negative sample pair.

Step 4: Update the semantic representation model by using the positive sample pair and the negative sample pair. A predicted loss is constructed by using a distance between the sample semantic vectors in the positive sample pair and a distance between the sample semantic vectors in the negative sample pair, so that the distance between the sample semantic vectors in the positive sample pair is as small as possible, and the distance between the sample semantic vectors in the negative sample pair is as large as possible. Then, the semantic representation model is updated by using the predicted loss. A plurality of model iterations are performed, and training can stop when the model training process converges.

A method for training a model for unlabeled texts is described above. If there is labeled information in the sample data, a model similar to Sentence-BERT can be used, and the semantic representation model is implemented through supervised learning, to obtain a better semantic representation effect. The labeled information in the text data can be a label indicating whether semantic meanings of every two texts are the same.

In step S220, a similarity matrix between the plurality of texts is determined based on the semantic vectors of the plurality of texts.

For any two texts, a similarity between the two texts can be determined based on semantic vectors of the two texts. The method can be used to determine the similarity between any two texts, thereby constructing a similarity matrix that includes a plurality of similarities. For example, a similarity matrix with a dimension of N*N can be constructed for N texts, where the similarity matrix includes N*N similarities. The similarity matrix is represented in a form of a table, as shown in Table 1.

TABLE 1

| | Text 1 | Text 2 | . . . Text N |
|---|---|---|---|
| Text 1 | Similarity 11 | Similarity 12 | . . . Similarity 1N |
| Text 2 | Similarity 21 | Similarity 22 | . . . Similarity 2N |
| . . . | . . . | . . . | . . . . . . |
| Text N | Similarity N1 | Similarity N2 | . . . Similarity NN |

Similarity 11, similarity 12, similarity 21, and similarity 22, etc. are elements in the similarity matrix. For text 1, for example, the similarities in the second row or the similarities in the second column are similarities between text 1 and other texts.

When a similarity is determined based on two semantic vectors, a cosine function, a covariance function, or a Euclidean distance algorithm can be used to measure the similarity between the two semantic vectors.

To increase a computing speed, when a similarity matrix between large-scale texts is determined, an existing computing tool can be used to quickly determine similarities between a large quantity of vectors to obtain the similarity matrix.

In step S230, M similar texts with maximum similarities respectively corresponding to the plurality of texts are determined from the similarity matrix; and the corresponding texts are as selected central texts when the similarities corresponding to the M similar texts are greater than a first threshold.

The first threshold can be a value specified in advance based on experience. M can be a value in a predetermined range, or can be determined based on a total quantity of the plurality of texts. M is an integer greater than 0, and M is less than a first value, where the first value can be a predetermined small value. For example, M can usually be but is not limited to 3 to 10. M can alternatively be one-Kth of the total quantity of the plurality of texts, but is less than the total quantity of the plurality of texts, where K can be a predetermined large value. For example, when the plurality of texts are 10 million texts, K can be a value ranging from millions to hundreds of thousands. M can usually be small data. When M is a small value in a specific range, isolated noise can be filtered out more quickly. The isolated noise here refers to a text whose semantic meaning has a similarity with semantic meanings of few texts and a class cluster cannot be formed. Performing text clustering on large-scale texts does not mean clustering all the texts, but means finding texts that can be clustered into a class from the texts and aggregating the texts into several class clusters that represent different semantic meanings. Texts that cannot be clustered can be discarded during text clustering.

To quickly select the M similar texts with the maximum similarities from the similarity matrix, a parallel computing tool encapsulated by a deep learning framework can be used, for example, a parallel computing tool encapsulated by a deep learning framework "pytorch" can be used; or a vector retrieval engine such as a vector retrieval engine "faiss" can be used to construct an index; or another mature tool can be used to implement the selection process. In addition, the selection process can be implemented by using a graphics processing unit (GPU) to increase a processing speed.

For example, for text 1 in Table 1, M maximum similarities can be quickly determined from similarity 11, similarity 12, . . . , and similarity 1N by using the parallel computing tool. When M is 5, assuming that the five maximum similarities are similarity 12, similarity 15, similarity 160, similarity 141, and similarity 123, it can be determined that M similar texts of text 1 include text 2, text 5, text 60, text 41, and text 23. When the M maximum similarities are determined, a similarity between the text and itself can be excluded, for example, similarity 11 can be removed for text 1.

When the similarities of the M similar texts are compared with the first threshold, to improve efficiency, a minimum similarity of the M similar texts corresponding to the first text can be compared with the first threshold. When the minimum similarity is greater than the first threshold, it is considered that the M similarities are all greater than the first threshold. In this case, it can be considered that the first text is not isolated noise. Therefore, the first text can be used as a selected central text. When the minimum similarity is not greater than the first threshold, it is considered that a quantity of similar texts of the first text is less than M, and the first text can be used as isolated noise, and is not processed during text clustering. The selected central text is relative to the isolated noise. The central text is a text that can be subsequently used as a member in a class cluster for clustering, and the central text can be used as an introduction text to perform clustering.

When massive to-be-clustered texts exist, an amount of data in the similarity matrix is also very large. When the M similar texts with the maximum similarities are selected for the text, only the similarities of the M similar texts are compared with the first threshold, and there is no need to compare N similarities with the first threshold, so that a processing speed can be increased to a great extent, thereby quickly selecting a central text that satisfies a condition and skipping a majority of isolated texts.

In step S240, the to-be-clustered texts are clustered based on data corresponding to the central texts in the similarity matrix.

After processing in step S230, the selected central texts usually occupy only a small part of all the texts. In the present step, the small part of texts continue to be clustered. The data corresponding to the central texts in the similarity matrix can be understood as including similarities between the central text and other texts. For example, assuming that text 1 is the central text, data corresponding to text 1 in the similarity matrix includes similarities between text 1 and other (N−1) texts.

Figure 3:
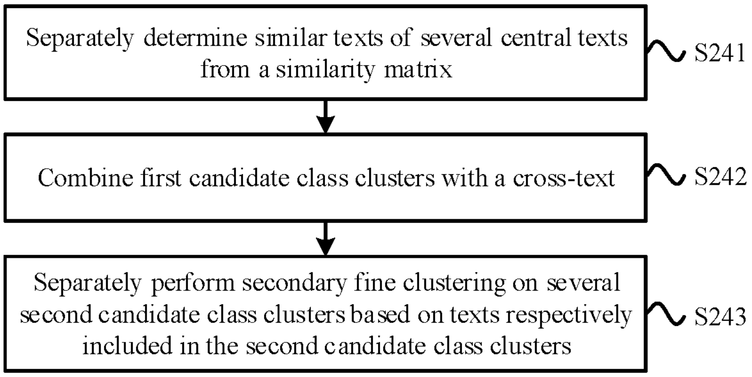
FIG. 3 is a schematic flowchart illustrating step S240, according to one or more embodiments.

In an implementation, step S240 can be performed based on FIG. 3. FIG. 3 is a schematic flowchart illustrating step S240, according to one or more embodiments, and specifically includes the following steps.

In step S241, similar texts of several central texts are separately determined from the similarity matrix, to obtain several first candidate class clusters.

In the present step, similar texts of several central texts can be separately determined based on similarities corresponding to the central texts in the similarity matrix, to obtain several first candidate class clusters.

For example, for any first central text in the several central texts, C similar texts with maximum similarities corresponding to the first central text are determined from the similarity matrix, and a similar text with a similarity greater than a second threshold in the C similar texts and the first central text are used as a corresponding first candidate class cluster. Several first candidate class clusters can be obtained by using the method. During specific implementation, to increase a processing speed, the previous parallel computing tool or the previous vector retrieval engine can be used to determine, from the similarity matrix, C similar texts with maximum similarities respectively corresponding to all the central texts.

The value C is greater than the value M, and the value C is an integer greater than 0 and is usually a large value. The second threshold can be a predetermined similarity value, and a value of the second threshold can be the same as or different from the first threshold.

Data in Table 1 is used as an example. It is assumed that N=10000, C is 1/10 of N, and C is 1000. For text 1, 1000 maximum similarities can be found from 10000 similarities: similarity 11, similarity 12, . . . , and similarity IN, and values of the 1000 similarities are compared with the second threshold to select a similarity greater than the second threshold. Text 1 and a text other than text 1 corresponding to the selected similarity are used as a first candidate class cluster. As such, class cluster agglomeration processing in high-efficiency coarse clustering in FIG. 1 is implemented.

C maximum similarities are selected from N similarities corresponding to the first central text and are compare with the second threshold, so as to avoid comparing all the N similarities with the threshold. Therefore, fast cluster agglomeration can be implemented, and unnecessary value comparison can be avoided. Setting of C here is very important. To cluster as many similar texts as possible, the value C can be set to a large value, but cannot be excessively large, because an excessively large value can affect a processing speed. The value of C can be obtained by performing statistical analysis on historical text clustering. For example, the value C can be 1/10 to 1/20 of N, for example, can be 1/15 of N.

In step S242, first candidate class clusters with a cross-text are combined to obtain several second candidate class clusters. There may be overlapping texts between the several first candidate class clusters obtained through processing in step S241. If there is a cross-text, it indicates that there is a certain similarity between two first candidate class clusters. To improve clustering accuracy, in step S242, the first candidate class clusters with a cross-text can be combined to obtain the several second candidate class clusters.

To improve processing efficiency, when the first candidate class clusters with a cross-text are combined in step S242, the several first candidate class clusters can be sorted in descending order of quantities of texts included in the first candidate class clusters; cross-text determining is sequentially performed on the sorted several first candidate class clusters, that is, cross-text determining is sequentially performed on the several first candidate class clusters; and class cluster combination is performed based on a determining result.

For example, a descending order of the quantities of included texts is: candidate class cluster a>candidate class cluster b>candidate class cluster c>candidate class cluster d. During cross-text determining, whether a cross-text exists between candidate class cluster a and candidate class cluster b is first determined, and if the cross-text exists, the two candidate class clusters are combined to obtain candidate class cluster ab. Next, whether a cross-text exists between candidate class cluster ab and candidate class cluster c is determined. If the cross-text does not exist, whether a cross-text exists between candidate class cluster ab and candidate class cluster d continues to be determined. If the cross-text does not exist, whether a cross-text exists between candidate class cluster c and candidate class cluster d continues to be determined.

A cross-text is more likely to exist between first candidate class clusters that include a larger quantity of texts. Therefore, when cross-text determining is performed on the first candidate class clusters in descending order of the quantities of texts, a processing speed during class cluster combination can be increased to a large extent. A more specific determining procedure can be set based on a requirement.

In an implementation, to more conveniently compare cross-texts, hash values of identifiers of the texts included in the several first candidate class clusters can be determined to obtain hash values of the texts included in each first candidate class cluster, that is, a mapping relationship between the first candidate class cluster and hash values included in the first candidate class cluster. When whether a cross-text exists between any two first candidate class clusters is determined, cross-text determining can be performed on the two first candidate class clusters based on matching between the hash values, so that the cross-text can be quickly determined.

During specific implementation, the following can be set: Two first candidate class clusters can be combined provided that a second quantity of cross-texts exists. The second quantity can be 1, 2, 3, or another integer value. In the class cluster combination phase, to improve accuracy of a class cluster, the second quantity usually can be set to 1. To be specific, two first candidate class clusters can be combined provided that there is one cross-text.

To prevent generation of a giant class cluster during class cluster combination, a limitation condition during combination can be further set. If a quantity of texts included in a combined first candidate class cluster is greater than a predetermined quantity threshold, combination stops to continue to be performed on the combined first candidate class cluster. Here, the predetermined quantity threshold can be set based on experience, for example, can be set to 3*C, that is, three times of the value C, or other values such as two times, four times, five times, or six times of C.

In step S243, secondary fine clustering is separately performed on the several second candidate class clusters based on texts respectively included in the second candidate class clusters, to obtain a class cluster for clustering the to-be-clustered texts. After the several second candidate class clusters are obtained, the present step is actually a process of performing class cluster splitting on the second candidate class clusters. Specifically, a result of performing secondary fine clustering on the several second candidate class clusters can be used as the class cluster for clustering the to-be-clustered texts.

For example, it is known that three second candidate class clusters are obtained: candidate class cluster A, candidate class cluster B, and candidate class cluster C. Secondary fine clustering is performed based on texts included in candidate class cluster A to obtain class cluster A1, class cluster A2, and class cluster A3, secondary fine clustering is performed based on texts included in candidate class cluster B to obtain class cluster B1 and class cluster B2, and secondary fine clustering is performed based on texts included in candidate class cluster C to obtain class cluster C1, class cluster C2, and class cluster C3. Based on the previous fine clustering results, it can be learned that final class clusters for clustering the to-be-clustered texts include: cluster A1, cluster A2, cluster A3, cluster B1, cluster B2, cluster C1, cluster C2, and cluster C3.

When secondary fine clustering is performed on any second candidate class cluster, clustering can be performed based on semantic vectors of texts included in the second candidate class cluster. In terms of a method used, an algorithm with a good clustering effect can be selected. For example, a hierarchical clustering algorithm can be used to separately perform secondary fine clustering on the several second candidate class clusters based on the texts included the second candidate class clusters; or a density-based HDBSCAN algorithm can be used to perform secondary fine clustering on the second candidate class clusters.

It can be learned from the previous embodiments that step S230 can be understood as class cluster selection processing in FIG. 1. Step S230, step S241, and step S242 joint form the high-efficiency coarse clustering phase, and fast coarse clustering of large-scale texts is implemented. Step S243 is secondary fine clustering after coarse clustering. In the one or more embodiments, efficiency and accuracy of clustering large-scale texts are improved by combining the fast coarse clustering with secondary fine clustering.

According to the previous embodiments, in the class cluster agglomeration phase, only Top-C texts with maximum similarities are selected to form a subsequent class cluster in the embodiments, which avoids that a candidate class cluster is excessively large due to some abnormal texts with strong connectivity, and reduces a quantity of operations of subsequent class cluster combination and secondary fine clustering while improving a clustering effect.

In the class cluster combination phase, in the embodiments, the operation of combining class clusters with a cross-part based on a result of sorting sizes of the class clusters by using a hash mapping table and the operation of limiting the size of the class cluster to 3*C both reduce complexity of the class cluster combination operation.

In the secondary fine clustering phase, clustering is performed again on the coarse clustering result, and a size of each class cluster is small, so that this operation can not only improve accuracy of the clustering result, but also ensure high effectiveness.

In this specification, "first" in words such as the first threshold, the first value, the first text, the first candidate class cluster, and the first central text, and "second" in this specification (if exists) are merely intended to facilitate distinguishing and description, and have no limitation meaning.

Specific embodiments of this specification have been described previously, and other embodiments fall within the scope of the appended claims. In some cases, actions or steps described in the claims can be performed in a sequence different from that in the embodiments and the desired results can still be achieved. In addition, processes described in the accompanying drawings do not necessarily require a specific order or a sequential order shown to achieve the desired results. In some implementations, multitasking and parallel processing are also possible or can be advantageous.

Figure 4:
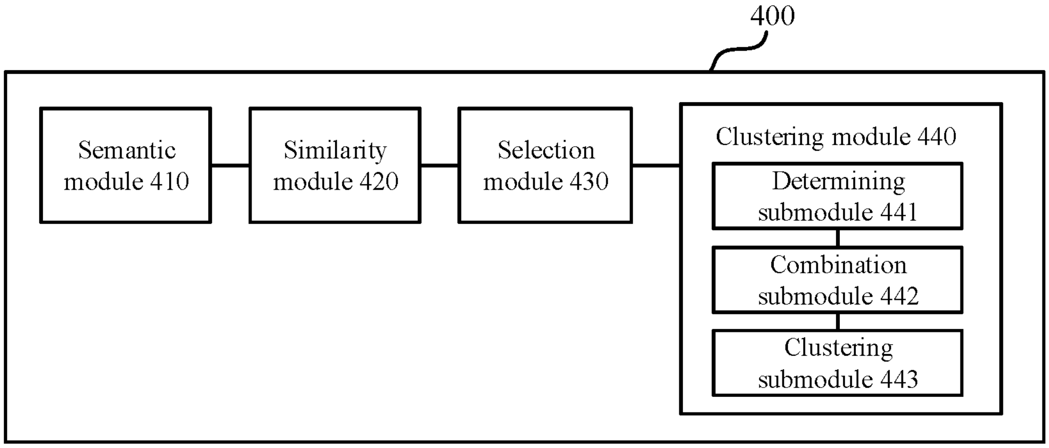
FIG. 4 is a schematic block diagram illustrating a large-scale text clustering apparatus, according to one or more embodiments.

FIG. 4 is a schematic block diagram illustrating a large-scale text clustering apparatus, according to one or more embodiments. The apparatus 400 is deployed in a computing device, and the computing device can be implemented by any apparatus, device, platform, device cluster, etc. that has a computing and processing capability. The apparatus embodiment correspond to the method embodiments shown in FIG. 2 and FIG. 3. The apparatus 400 includes:

a semantic module 410, configured to: for to-be-clustered texts including a plurality of texts, determine, by using a semantic representation model, semantic vectors respectively corresponding to the plurality of texts;

a similarity module 420, configured to determine a similarity matrix between the plurality of texts based on the semantic vectors of the plurality of texts;

a selection module 430, configured to determine, from the similarity matrix, M similar texts with maximum similarities respectively corresponding to the plurality of texts; and use the corresponding texts as selected central texts when the similarities corresponding to the M similar texts are greater than a first threshold; and a clustering module 440, configured to cluster the to-be-clustered texts based on data corresponding to the central texts in the similarity matrix.

In an implementation, the semantic module 410 is configured to:

determine, by using the semantic representation model, semantic vectors that are respectively corresponding to the plurality of texts and that include global semantic information of the texts.

In an implementation, that the selection module 430 determines, from the similarity matrix, M similar texts with maximum similarities respectively corresponding to the plurality of texts includes:

determining, from the similarity matrix, the M similar texts with the maximum similarities respectively corresponding to the plurality of texts by using a parallel computing tool encapsulated by a deep learning framework, or by constructing an index by a vector retrieval engine.

In an implementation, that the selection module 430 uses the corresponding texts as selected central texts when the similarities corresponding to the M similar texts are greater than a first threshold includes:

for any of the plurality of texts, comparing a minimum similarity of the M similar texts corresponding to the text with the first threshold, and using the text as the selected central text when the minimum similarity is greater than the first threshold.

In an implementation, the clustering module 440 includes:

a determining submodule 441, configured to separately determine similar texts of several central texts from the similarity matrix, to obtain several first candidate class clusters;

a combination submodule 442, configured to combine first candidate class clusters with a cross-text to obtain several second candidate class clusters; and a clustering submodule 443, configured to separately perform secondary fine clustering on the several second candidate class clusters based on texts respectively included in the second candidate class clusters, to obtain a class cluster for clustering the to-be-clustered texts.

In an implementation, the determining submodule 441 is specifically configured to:

for any first central text in the several central texts, determine, from the similarity matrix, C similar texts with maximum similarities corresponding to the first central text, and use a similar text with a similarity greater than a second threshold in the C similar texts and the first central text as a corresponding first candidate class cluster, to obtain several first candidate class clusters, where C is greater than M.

In an implementation, the combination submodule 442 includes:

a sorting unit (not shown in the figure), configured to sort the several first candidate class clusters in descending order of quantities of included texts; and a combination unit (not shown in the figure), configured to sequentially perform cross-text determining on the sorted several first candidate class clusters, and perform class cluster combination based on a determining result.

In an implementation, that the combination unit sequentially performs cross-text determining on the sorted several first candidate class clusters includes:

determining hash values of identifiers of the texts included in the several first candidate class clusters; and sequentially performing cross-text determining on the sorted several first candidate class clusters based on matching between the hash values.

In an implementation, the combination submodule 442 further includes:

a stop unit (not shown in the figure), configured to: after class cluster combination is performed based on the determining result, for any combined first candidate class cluster, if a quantity of texts included in the combined first candidate class cluster is greater than a predetermined quantity threshold, stop continuing to perform combination on the combined first candidate class cluster.

In an implementation, the clustering submodule 443 is specifically configured to:

separately perform, by using a hierarchical clustering algorithm, secondary fine clustering on the several second candidate class clusters based on texts respectively included in the second candidate class clusters.

The previous apparatus embodiment corresponds to the method embodiments. For specific descriptions, references can be made to the descriptions of the method embodiments. Details are omitted here for simplicity. The apparatus embodiment is obtained based on the corresponding method embodiment, and has the same technical effect as the corresponding method embodiment. For specific descriptions, references can be made to the corresponding method embodiment.

One or more embodiments of this specification further provide a computer-readable storage medium. The computer-readable storage medium stores a computer program, and when the computer program is executed in a computer, the computer is enabled to perform the method in any of FIG. 1 to FIG. 3.

One or more embodiments of this specification further provide a computing device, including a memory and a processor. The memory stores executable code, and when executing the executable code, the processor implements the method in any of FIG. 1 to FIG. 3.

The embodiments of this specification are described in a progressive way. For the same or similar parts of the embodiments, mutual references can be made between the embodiments. Each embodiment focuses on a difference from other embodiments. Particularly, the embodiments of the storage medium and the computing device are basically similar to the method embodiments, and therefore are described briefly. For related parts, references can be made to some descriptions in the method embodiments.

A person skilled in the art should be aware that, in the above-mentioned one or more examples, functions described in the embodiments of this application can be implemented by hardware, software, firmware, or any combination thereof. When the functions are implemented by software, the functions can be stored in a computer-readable medium or transmitted as one or more instructions or code on the computer-readable medium.

The previous specific implementations further describe in detail the objectives, technical solutions, and beneficial effects of the embodiments of the this specification. It should be understood that, the previous descriptions are merely specific implementations of the embodiments of this specification, and are not intended to limit the protection scope of this specification. Any modification, equivalent replacement, or improvement made on the basis of the technical solutions in this specification shall fall within the protection scope of this specification.

What is claimed is:

1. A text clustering method, comprising:

obtaining a plurality of texts to-be-clustered;

determining, by using a semantic representation model, semantic vectors respectively corresponding to the plurality of texts;

determining a similarity matrix of the plurality of texts based on the semantic vectors of the plurality of texts, the similarity matrix comprising pairwise similarities between respective texts of the plurality of texts;

for each text among the plurality of texts, determining, from the similarity matrix, M similar texts that have highest similarities to the text, and determining whether respective similarities of the M similar texts to the text are greater than a a first threshold, and determining the text as a central text in response to the respective similarities of the M similar texts to the text being greater than the first threshold;

for each central text, determining, from the similarity matrix, similar texts to the central text, forming a cluster based on the central text and the similar texts to the central text, and outputting the cluster.

2. The method according to claim 1, wherein the step of determining semantic vectors respectively corresponding to the plurality of texts comprises:

determining, by using the semantic representation model, semantic vectors that are respectively corresponding to the plurality of texts and that comprise global semantic information of the plurality of texts.

3. The method according to claim 1, wherein the step of determining the M similar texts comprises:

determining, from the similarity matrix, the M similar texts that have the highest similarities by using a parallel computing tool encapsulated by a deep learning framework, or by constructing an index by a vector retrieval engine.

4. The method according to claim 1, wherein determining the text as a central text comprises:

comparing a minimum similarity among the respective similarities of the M similar texts with the first threshold, and determining the text as a central text when the minimum similarity is greater than the first threshold.

5. The method according to claim 1, wherein for each central text. determining, from the similarity matrix, similar texts to the central text, and forming a cluster based on the central text and the similar texts to the central text comprises:

separately determining, from the similarity matrix, similar texts of a plurality of central texts, to obtain a plurality of first candidate class clusters, each first candidate class cluster comprising a respective central text and determined similar texts;

combining first candidate class clusters that share at least one common text to obtain a plurality of second candidate class clusters; and separately performing secondary fine clustering on the plurality of second candidate class clusters based on texts respectively comprised in the second candidate class clusters, to obtain a class cluster for clustering the to-be-clustered texts.

6. The method according to claim 5, wherein the step of separately determining similar texts of a plurality of central texts from the similarity matrix comprises:

for any first central text in the plurality of central texts, determining, from the similarity matrix, C similar texts with maximum similarities corresponding to the first central text, and using a similar text with a similarity greater than a second threshold in the C similar texts and the first central text as a corresponding first candidate class cluster, to obtain a plurality of first candidate class clusters, wherein C is greater than M.

7. The method according to claim 5, wherein the step of combining first candidate class clusters that share at least one common text comprises:

sorting the plurality of first candidate class clusters in descending order of quantities of comprised texts; and sequentially performing, on the sorted plurality of first candidate class clusters, a determination of whether any two clusters share at least one common text, and combining clusters based on a result of the determination.

8. The method according to claim 7, wherein the step of sequentially performing, on the sorted plurality of first candidate class clusters, a determination of whether any two clusters share at least one common text comprises:

determining hash values of identifiers of the texts comprised in the plurality of first candidate class clusters; and sequentially performing, on the sorted plurality of first candidate class clusters, a determination of common texts based on matching between the hash values.

9. The method according to claim 7, after combining clusters based on the result of the determination, further comprising:

for any combined first candidate class cluster, upon determining that a quantity of texts comprised in the combined first candidate class cluster is greater than a predetermined quantity threshold, stopping continuing to perform combination on the combined first candidate class cluster.

10. The method according to claim 5, wherein the step of separately performing secondary fine clustering on the plurality of second candidate class clusters comprises:

separately performing, by using a hierarchical clustering algorithm, secondary fine clustering on each of the plurality of second candidate class clusters based on texts respectively comprised in the second candidate class clusters.

11. The method according to claim 1, wherein M is a value in a predetermined range, or M is determined based on a total quantity of the plurality of texts.

12. A non-transitory computer-readable storage medium having stored therein instructions that, when executed by a processor of a computing device, cause the processor to:

obtain a plurality of texts to-be-clustered;

determine, by using a semantic representation model, semantic vectors respectively corresponding to the plurality of texts;

determine a similarity matrix of the plurality of texts based on the semantic vectors of the plurality of texts, the similarity matrix comprising pairwise similarities between respective texts of the plurality of texts;

for each text among the plurality of texts, determine, from the similarity matrix, M similar texts that have highest similarities to the text, and determine whether respective similarities of the M similar texts to the text are greater than a first threshold, and determine the text as a central text in response to the respective similarities of the M similar texts to the text being greater than the first threshold;

for each central text, determine, from the similarity matrix, similar texts to the central text, form a cluster based on the central text and the similar texts to the central text, and output the cluster.

13. A computing device, comprising a memory and a processor, wherein the memory stores executable instructions that, in response to execution by the processor, cause the processor to:

obtain a plurality of texts to-be-clustered;

determine, by using a semantic representation model, semantic vectors respectively corresponding to the plurality of texts;

determine a similarity matrix of the plurality of texts based on the semantic vectors of the plurality of texts, the similarity matrix comprising pairwise similarities between respective texts of the plurality of texts;

for each text among the plurality of texts, determine, from the similarity matrix, M similar texts that have highest similarities to the text, and determine whether respective similarities of the M similar texts to the text are greater than a first threshold, and determine the text as a central text in response to the respective similarities of the M similar texts to the text being greater than the first threshold;

for each central text, determine, from the similarity matrix, similar texts to the central text, form a cluster based on the central text and the similar texts to the central text, and output the cluster.

* * * * *